Sept. 21, 1937.  J. BILLITER  2,093,770
ELECTRICAL PURIFICATION OF LIQUIDS
Filed Jan. 13, 1933   2 Sheets-Sheet 2
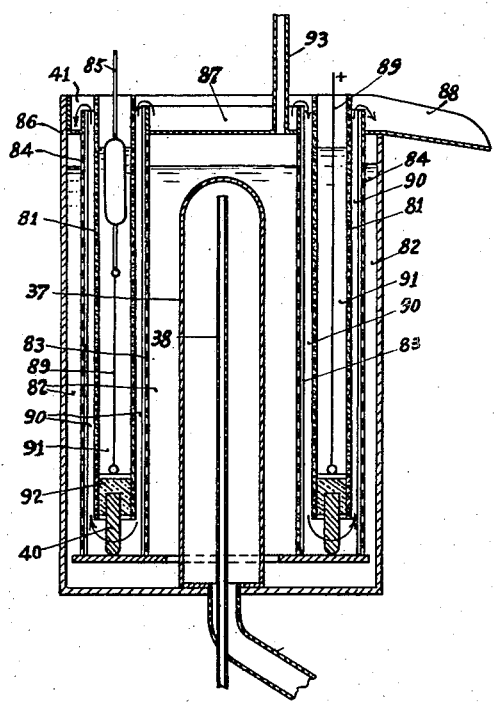
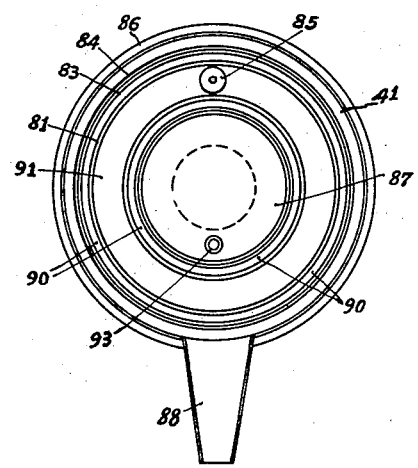
Inventor:
Jean Billiter
by Karl Michaelis
Atty.

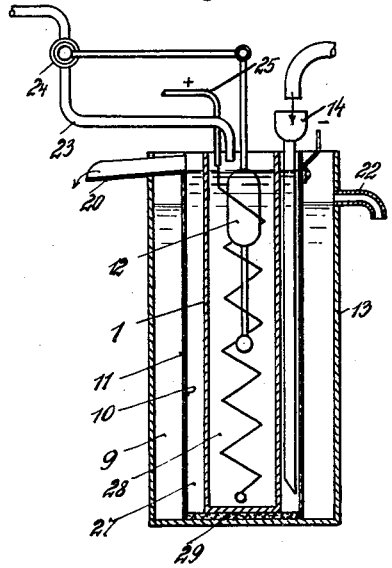
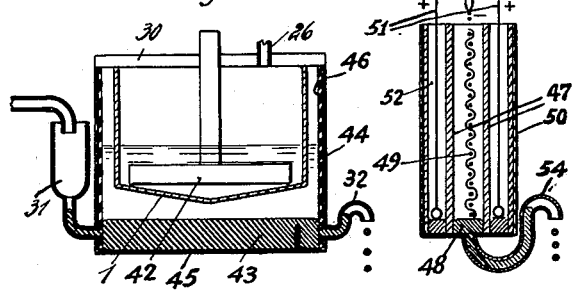

Patented Sept. 21, 1937

2,093,770

UNITED STATES PATENT OFFICE 2,093,770

ELECTRICAL PURIFICATION OF LIQUIDS

Jean Billiter, Vienna, Austria

Application January 13, 1933, Serial No. 651,507
In Germany January 15, 1932

10 Claims. (Cl. 204—25)

My invention relates to the electrical purification of liquids such as water and more particularly to methods by which raw water and similar liquids in which inorganic salts are dissolved are freed from these compounds either partly or completely by the action of an electrical current.

It is an object of my invention to render such processes more efficient and less expensive than was heretofore possible.

Another object of my invention is the provision of an improved apparatus for carrying out these methods.

Further objects of my invention will appear as the specification proceeds.

After all attempts had failed to purify water by electrical means without using diaphragms or with the use of a single diaphragm for each cell, suggestions were made to desalt water by electroosmotic means in so-called three-compartment cells, each cell being provided with a positively charged diaphragm at the anode side and with a negatively charged diaphragm at the cathode side. Apart from the fact that electroosmosis is not capable of bringing about a desalting effect for reasons given further below, these suggestions were not commercially successful either because no suitable materials for the diaphragms could be found. At present the electrical desalting of liquids is generally carried out by electro-dialysis, although the effect thus obtained is erroneously ascribed to electroosmotic phenomena.

In these processes the liquid to be treated is kept separated from the electrodes by two diaphragms both of which usually consist of substantially non-charged materials such as sail cloth or the like. If only a partial purification of the liquid is desired, it has been suggested to use ceramic diaphragms at both sides of the cell. In order to arrive at the desired desalting effect, all authors and inventors describe and consider it indispensable to wash or flush the electrode compartments with raw water, with distilled water or even with water partially purified in the cell itself. By such washing steps it is intended to systematically keep the concentration of electrolytes in the electrode compartments as low as possible, and to systematically remove from the cells, together with the wash water, as much of the electrolytes as possible.

It is generally believed to-day that the recovery of completely desalted water by electro-dialysis is only possible if the electrode compartments or at least the last electrode compartments of a series of cells contain liquids in which only a small percentage of electrolytes is dissolved. It is further believed that a complete desalting necessitates the use of such diaphragm materials which do not cause an electroosmotic migration of water from the electrode compartments into the middle compartment or middle chamber which contains the liquid to be purified.

This latter consideration accounts for the fact that in the complete desalting of liquids diaphragms consisting of filter fabrics are to-day in use exclusively, although they are not durable and are very rapidly destroyed when used for the desalting of water which is rich in chlorides such as is found in many places. The advantage offered by these diaphragms, viz. that they are charged only to a negligible extent and that consequently they do not exert a distinct electroendosmotic effect, is, however, considered to be decisive.

It will be understood, however, that methods for desalting liquids by electrical means cannot meet with a striking technical and commercial success and that they cannot compete with the processes of recovering pure water by distillation, unless the diaphragms used are very durable and can be used for the desalting of water of any composition occurring in actual practice.

Substantially all diaphragm materials which have proven to be durable in the desalting of liquids are comparatively strongly charged negatively, at least so when in contact with a dilute solution of potassium chloride, i. e. the standard solution for testing the charge of diaphragm materials. In contact with anode liquors, the charge of the diaphragm materials, as a rule, will not greatly differ therefrom. Starting from this experience and from the fact that all these diaphragms exert strong electro-osmotic or electroendosmotic effects, I have attempted to so improve the methods for purifying liquids by the action of the electrical current that they result in a substantially complete desalting effect even with diaphragms of this type.

According to my invention I obtain this result by the adoption of steps which are to a large extent contrary to those heretofore adopted. While hitherto it was usual to keep the concentration of the electrolytes in the electrode liquors as low as possible by means of washing water introduced into the electrode compartments, I intentionally provide for an increased acid content of the anodic electrode liquor, thereby also increasing its conductivity. This enables me to operate the cell at an increased current density and at an elevated temperature. An increased concentration of the cathodic electrode liquor may be advantageous for similar reasons.

According to one modification of my invention I do not wash or flush the electrode compartments at all, or I wash them but slightly in order to secure constant levels of liquid in the respective compartments but not in order to keep low the electrolyte contents of the electrode liquors.

I may avoid substantially any addition of liquid to, as well as any removal of liquid from the anode compartments. In such a case the anodic electrode liquor becomes more and more rich in acid, because the passing of the electrical current through the cell results in an immigration of anions such as $SO_4^{--}$ into the anode compartment, and these ions when discharged at the anode, form equivalent amounts of acid with attendant evolution of oxygen. Acids of this type, more particularly sulfuric acid, are contained almost in every raw water in the form of salts.

When using diaphragms which are distinctly charged under the conditions actually occurring in the cells and which therefore cause distinct electro-endosmotic effects, it will be understood that the use of such diaphragms at least at the anode side of the cells, is particularly contemplated in the present invention. It is, however, not possible to altogether avoid any migration of liquid through the diaphragms. The intended purpose, i. e. the increasing of the acid contents of the anodic electrode liquor may, however, be automatically fulfilled by compensating for the electro-endosmotic migration of liquid by the addition or withdrawal of corresponding amounts of liquids.

Most of the diaphragm materials which can be used at the anode side of the cell are charged negatively and consequently cause an emigration of anodic electrode liquor from the anode compartment into the middle compartment, and this is frequently true to such an extent that the anode compartments soon become empty unless additional liquid is introduced thereinto. Such a supply of liquid can, however, readily be provided for in an automatic manner.

In the drawings annexed to this specification and forming part thereof several forms of apparatus embodying my invention are illustrated diagrammatically by way of example.

In the drawings

Fig. 1 is a sectional elevation of a cell for the electrical purification of water, Fig. 2 is a similar view of a cell provided with a mercury cathode, Fig. 3 is a sectional elevation of a modified form of a cell similar to that shown in Fig. 2, Fig. 4 is an elevation and, partly, a section of a number of cells connected in series, Fig. 5 is an elevation and, partly, a section of an arrangement of superimposed cells connected with a heat-exchanger, Fig. 6 is a sectional elevation of a cell provided with heating means, Fig. 7 is a plan view of a cell shown in Fig. 6.

Referring to the drawings, the cell shown in Fig. 1 comprises a tank 13 provided with an overflow pipe 22 situated somewhat below the top rim of the tank. Within the cell, which is preferably cylindrical, a cylindrical cathode 11, preferably made of perforated sheet iron, is arranged, the inner face of which is tightly covered with a so-called filter diaphragm 10 made of asbestos paper or a similar flexible readily permeable material. A rubber disk 29 tightly closes the bottom of the cylindrical vessel consisting of the cathode 11 and the diaphragm 10, and an overflow 20 permits keeping the liquid within this vessel at a higher level than prevails in the tank 13.

To the bottom of the cathodic vessel extends a raw water supply 14. The anodic diaphragm 1, which may be made for instance of ceramic material and also forms a cylindrical vessel, is concentrically arranged in the cell. The anode consists of a coil of wound-up platinum wire 25. No means are provided for the withdrawal of anodic electrode liquor, and the liquid supply 23 is regulated by a valve 24 operated through suitable levers by a float 12 also arranged in the anode compartment. The parts 12, 23, and 24 are so adjusted that the level of liquid in the anodic compartment substantially corresponds to the level in the middle compartments, which in turn depends on the height of the overflow 20.

The anodic diaphragm represents a cup, which may readily be withdrawn from the interior 9 of the cell, as it is not secured to any parts thereof. Substantially the same is true with regard to the structural unit consisting of the cathode 11, cathodic diaphragm 10, the overflow 20 and perhaps the disk 29.

When operating this cell, the water to be purified is continuously supplied to the middle compartment through the supply pipe 14, and the purified water automatically passes off through the overflow 20. The voltage applied to the anode and the cathode causes not only a purification of the water in the middle compartment, but also a gradually increasing acid concentration of the anodic electrode liquor filling the central or anode compartment.

By electro-endosmotic action some liquid from the anode compartment is passed through the pores of the diaphragm 1 into the middle compartment, and this liquid is replaced by raw water automatically supplied to the anode compartment through the pipe 23 controlled by the float 12.

The electro-endosmotic migration of water through the cathodic diaphragm 10 may vary its sign. Initially some water will be transferred from the middle or anode compartment 28 into the cathode compartment 29, although the amounts thereof will be comparatively small in view of the hydrostatic difference of pressure prevailing between the middle compartment and the cathode compartment, which difference tends to force part of the liquid from the middle compartment to the cathode compartment. In the course of operation the charge of the diaphragm 10 may be reduced by alkaline metal compounds originating from the water and deposited in and on the diaphragm. I have frequently observed that even the sign of the charge of the cathodic diaphragm is altered so that the electro-endosmotic effect, if any, carries liquid from the cathode compartment into the middle compartment.

It will be appreciated that this cell is of a particularly simple design, since there is no necessity of tightening the three compartments relative to each other. There is further no liquid supply to the cathode compartment nor a liquid discharge from the anode compartment, with attendant simplification of the cell. The supply of liquid to the anode compartment is restricted to the amount required to replace the liquid carried off electro-endosmotically, in contradistinction to the usual passing of considerable quantities of washing liquor through the electrode compartments of the cells.

If the liquid supplied through the pipe 23 is absolutely pure water, the composition and concentration of the anodic electrode liquor will be substantially the same as if any migration of liquid into or from the anode compartment were altogether prevented. For reasons which will be stated further below, the addition of foreign cations to the anolyte is as a rule not advantageous, but the unfavorable effect is rather low if the liquid emigrating from the anode compartment is replaced by raw water. In such a case the conductivity of the anolyte is increased still more rapidly and this advantage compensates for the above mentioned disadvantage. In certain cases, for instance when starting the operation of a cell, some acid may be added to the anolyte contained in the anode compartment or to the liquid supplied through pipe 23.

The cell shown in Fig. 2 consists of a steel vessel 44, the side walls of which are covered with an insulating lining 46. The bottom is covered with a layer 43 of mercury, which is supplied through the funnel 31 and withdrawn through a discharge pipe 32 having the shape of a syphon. The layer of mercury 43 forms the cathode and is in contact with the bottom of the metallic vessel 44, which is in turn connected with the negative pole of the source of electricity. Within the vessel is further provided a cylindrical diaphragm 42 closed at the bottom and provided with the anode 45 which is connected with the positive pole. The tank is covered by a lid 30 provided with a gas outlet 26 and with various pipes (not shown) which serve for the supply of water to be purified to the space between the mercury layer 43 and the anodic diaphragm 42, and for the supply of additional liquid into the anode compartment, the latter supply pipe being controlled by a float-regulated valve similar to that described with reference to Fig. 1.

As mercury is capable of alloying with alkali metals and alkaline earth metals, the mercury cathode need not be protected by a cathodic diaphragm. As far as the cathode is concerned, this cell may be operated in the same manner as the cells which are in current use for the electrolytic manufacture of caustic alkalis, the mercury being passed through the cell at such a rate that the mercury alloy forming remains liquid. It is then freed from alkali and alkaline earth metals and the regenerated mercury is returned into the cell in cycle.

The cell shown in Fig. 3 differs from that shown in Fig. 2 mainly in that it is provided with a so-called vertical mercury cathode 48 and with two anodes. The tank 50 lined with insulating material 52 is divided into three compartments by two anodic diaphragms 47. The two side compartments contain anodes 51 consisting of a plurality of straight platinum wires, and the liquid in these compartments is maintained at a constant level by an automatic leveling device (not shown) corresponding to that shown in Fig. 1. The middle compartment is provided with a vertical wire-gauze partition 49 on which trickles down mercury supplied through the supply pipe 53, thus forming constantly renewed mercury surfaces which act as a cathode, the mercury supply 53 being connected with the negative pole. At the bottom of the middle compartment an alloy of mercury and alkali forming and alkaline earth metals collects, which is led off through the overflow pipe or syphon 54 to be re-generated and the mercury re-turned to the mercury supply pipe 53.

The water to be purified is supplied to the bottom of the middle compartment and withdrawn from the top of this compartment in a purified form through two pipes which are not shown in the drawings as their arrangement is obvious.

Each of the cells shown in Fig. 4 comprises a tank 59 closed by a lid 65 and having its bottom covered with an electrically insulating layer 64, consisting for instance of rubber. Within this cell a cylindrical cathode 58 is arranged, which consists of perforated sheet metal and is covered on its inner surface with a cathodic diaphragm 57 consisting for instance of asbestos paper. The spacing device 8 holds the cathode 58 in the correct position within the cell chamber 56 and presses it down against the rubber layer 64. Concentrically to the cathode an anodic diaphragm 62 is arranged which is made of ceramic material and with a constricted portion 55 tightly passes through an opening in the bottom of the cell. Outside of the cell the anodic diaphragm is connected with a T-piece 2, one branch of which is closed by a cock 3, while the other branch 4, which consists of a comparatively narrow pipe, leads to a leveling device 5 which is connected with a supply pipe 6 and with an overflow pipe 7.

Within the anode compartment 63 a magnetite anode 61 is provided, while the cathode compartment 62 contains a platinum cathode 57. The various cells of the series are arranged at gradually decreasing levels. The overflow pipe 60 of the middle compartment of each cell is connected with the middle compartment of the following cell, to the bottom of which the pipe 60 leads. The leveling devices of the cells are connected with each other in such way that the overflow pipe 7 of each of them is connected with the supply pipe 6 of the immediately succeeding cell.

In operating these cells the water to be purified is supplied through pipe 60 to the middle compartment of the first of them. It then passes through the middle compartments of all the cells of the series and is withdrawn from the last of these cells in a purified state. A small quantity of liquid, which may also consist of raw water, is supplied through pipe 6 to the leveling device 5 of the first cell, leaves this device 5 through the overflow 7, enters the leveling device of the next cell, and so on. If in any of the anode compartments of the series a lack of liquid should occur, the corresponding amount of water will be supplied to this compartment through the corresponding connection 4. Similarly, if the level of liquid within one of the anode compartments should tend to rise, the surplus liquid will be discharged through the connection 4 to the corresponding leveling device 5. It will be understood that the arrangement here shown affords a particularly simple leveling of the liquid within the various anode compartments at predetermined levels, the liquid in these compartments (the anolyte) becoming enriched in acid for the same reasons as were explained above with reference to Fig. 1.

A somewhat similar arrangement of cells which are, however, super-imposed to one another, is shown in Fig. 5. Each cell comprises a tank 75, a cathode 72 covered on its interior face with an asbestos diaphragm 73, and a ceramic anodic diaphragm 67 surrounding an anode (not shown)

and passing with a restricted portion through the bottom of the cell. All these particulars altogether correspond to those described with reference to Fig. 4. The leveling device 68 is, however, arranged inside of the anode compartment; it consists of a cylindrical vessel open at the top, closed at the bottom and communicating with the anolyte through an orifice 74, which renders the same services as the connection 4 shown in Fig. 4. The overflow pipe 70, which is open at the top, is arranged to maintain the desired height of level within the anode compartment and carries off any superfluous liquid to the leveling device 68 of the next succeeding cell. Raw water is supplied to the leveling device 68 of the topmost cell through a supply pipe 69, and it will be understood that the pipe 6 in co-operation with the leveling devices 68 and the overflow pipes 70 acts in the same way and renders the same services as the leveling arrangement 74, 68, 69, and 70 shown in Fig. 5, one advantage of this vertical arrangement consisting in that hose connections or packings are dispensed with.

Overflow from the cell chamber 71 flows off through overflow pipe 78. The cathode and anode compartments 79 and 80, respectively, naturally correspond to the similar compartments of the previously described forms of apparatus.

Below the last cell of this series a heat-exchanger 15 is arranged comprising a shell 15 and a plurality of tubes 16 arranged between two tube plates 35 and 36, the liquid to be preheated being supplied through the pipe 33 and passing through the interstices 17 between these tubes to pipe 34. The hot purified liquid discharged from the last cell is fed through the collecting funnel 76 to the top of the heat-exchanger, then passes through the tubes 16 and is ultimately withdrawn in a cooled state through the overflow pipe 18.

The preheated liquid passes through pipe 34 to the top of the topmost cell, is fed through the collecting funnel 14 to the bottom of the middle compartment of this cell, and discharged through the overflow pipe 77 in a partially purified state. It is then collected by the collecting funnel 76 of the next succeeding cell, passed through its middle compartment, and so on. It will be understood that the operation of this arrangement is fully automatic, as only raw water is supplied through pipe 33 and purified water withdrawn through the overflow 18 in a continuous manner.

While in Figs. 1 to 5 I have shown cells of different design, it will be understood that none of them is superior to the others, election depending upon the composition of the liquid to be purified, the desired extent of purification, the desired output, energy efficiency and similar circumstances.

A cell yielding a particularly high output per unit of bottom area is that shown in Figs. 6 and 7. It comprises a tank 86 in which two concentric cathodes 83 and 84 are arranged, both consisting of perforated sheet metal. These cathodes are covered at their opposite faces with flexible diaphragms 90 consisting for instance of asbestos paper or asbestos fabric. Two cylindric anodic diaphragms 81 made for instance of ceramic material are arranged within the annular space defined by the two cathodes 83 and 84, and these anodic diaphragms are spaced from each other by a tightly inserted ring 92 made of concrete or the like. The double-walled anodic diaphragm thus formed rests on feet 40 which allow liquid to pass from one of the cathodes to another one. The anode compartment 91 defined by the two anodic diaphragms 1 contains anodes 89 consisting of straight platinum wires and a float 85 influencing a valve (not shown) of a supply pipe (not shown) for liquid, which acts in the same way and renders the same services as the supply pipe 23 shown in Fig. 1. The top of the cell is tightly covered with a lid 41 provided with a projecting pipe 93 for leading off evolved hydrogen and an annular opening through which pass the upper rims of the cathode cylinders. One side of the lid is provided with an overflow 20 for the purified liquid. In the central portion of the cell is arranged a cylindrical heating vessel 37 of sheet iron or the like which is provided with a steam supply pipe 38 and a discharge pipe 39 for condensed water.

This cell is operated as follows:

The water to be purified is continuously supplied to the basin 87 represented by the central portion of the lid 41 of the cell and from this basin flows over the rim of the inner cathode 83 down into the space defined by this cathode and the inner anodic diaphragm 81. At the bottom of this space the water passes into the space defined by the outer anodic diaphragm 81 and the outer cathode 84 and leaves this space by flowing over the rim of the cathode 84. It then leaves the cell in a purified state through the overflow 88.

As under the conditions prevailing in the cell the diaphragm 81 is negatively charged, some liquid will emigrate from the anode compartment into the middle compartment which is formed of two annular spaces connected only at their lowest portions. The liquid thus withdrawn from the anode compartment is replaced by additional liquid, for instance by raw water, supplied in an amount which is controlled by the float 85, so that the levels of liquid in the anode compartment and in the middle compartment remain constant, and preferably substantially equal.

If water rich in chlorides and also containing considerable amounts of other dissolved inorganic matter is to be purified, or if even seawater containing up to 35,000 mgs. per liter of inorganic matter is to be desalted, cells of the type shown in Figs. 2 and 3 provided with mercury cathodes should be used at least for the initial desalting step. Experience has shown that this and other mercury cells are particularly suitable for such a purpose, provided that the mercury cathode is used in combination with a negatively charged anodic diaphragm, for instance with a ceramic diaphragm, and that the anodic liquor or anolyte is kept, in accordance with one of the basic ideas underlying the present invention, at a constant level and at a comparatively high acid concentration.

The desalting of liquids having a medium or low salt contents and the complete desalting of sea-water or other kinds of water originally having a comparatively high salt contents after having been partly desalted in mercury cells of the above mentioned type is more advantageously carried out in cells provided with diaphragms both at the anode and at the cathode sides, such as are shown for instance in Figs. 1, 4, and 5.

Cells of the type shown in Fig. 4 are particularly advantageous for loads or yields ranging from 2 to 40 liters water per hour, while the cells according to Fig. 1 or 4 are designed for outputs of 100 to 5000 liters water per hour.

In any case anolytes are used which contain not less electrolyte than the liquid to be purified, these anolytes, in the course of electrolysis becoming more and more rich in acid. Such an increase in concentration, which was heretofore considered to be highly detrimental, exerts, in accordance with the results of my investigations, a distinctly advantageous effect, which cannot be explained without abandoning the heretofore established hypothesis that a commercial operation of desalting cells be impossible unless more ions are withdrawn from the middle compartment than are supplied to it. The fact that equal quantities of electricity must pass through any of the section planes which can be assumed between the electrodes parallel to the diaphragms, and that each of these planes must consequently be crossed by equal numbers of ions, indicates that the above mentioned supposition cannot be correct. In contradistinction thereto I believe the phenomena occurring in electrical desalting processes, for instance in the electrolytic removal of $Na_2SO_4$ from its solution, to be substantially as follows:

If such a solution of $Na_2SO_4$ is subjected to the action of direct current in the middle compartment of a cell of the type here in question, the catholyte or cathodical electrode liquor becomes alkaline and the anolyte or anodical electrode liquor becomes acid, as is well known to those skilled in the art. Under the influence of the current $H^+$ ions pass from the anolyte into the solution to be purified and $SO_4^{--}$ ions pass from this solution into the anolyte, the ratio of these two ions corresponding to the migration coefficients of sulfuric acid, approximating 0.807 to 0.193 in the case of $$\frac{N}{20}$$

solutions. $SO_4$ ions thus introduced into the anolyte or otherwise contained therein are discharged at the anode, but as the discharged radical $SO_4$ immediately reacts with water under formation of sulfuric acid and oxygen, the anolyte becomes more and more rich in sulfuric acid.

In an analogous manner $OH^-$ ions are passing from the cathode compartment into the middle compartment, while $Na^+$ ions migrate in the other direction, the ratio again corresponding to the coefficients of migration (i. e. to the so-called transference numbers) of the corresponding compound (NaOH), approximating 0.81 to 0.19. Again the $Na^+$ ions are discharged at the cathode, but the metal thus formed immediately reacts with water with the formation of hydrogen and NaOH, with which the catholyte becomes more and more enriched.

In the middle compartment all of the immigrated $OH^-$ ions react with the equivalent amount of $H^+$ ions under the formation of undissociated water, there remaining over 0.007 equivalents of hydrogen ions. The emigration of 0.19 equivalents of $Na^+$ ions and 0.183 equivalents of $SO_4$ ions results in the disappearance of 0.19 equivalents of sodium sulfate, the remaining surplus of 0.007 equivalents $SO_4^{--}$ ions representing, together with the above mentioned remainder of 0.007 equivalents $H^+$ ions, an amount of 0.007 equivalents $H_2SO_4$, by which the solution underlying the purification becomes acidified.

The explanation here given is not an altogether complete one, since the anolyte emits into the middle compartment not only $H^+$ ions, but also all of the other cations which it contains, the proportion of the various emigrating cations corresponding to their respective migrating velocities. Similarly the catholyte emits into the middle compartment not only $OH^-$ ions, but also other anions which it contains, the relative proportion of the emigrating anions corresponding to their relative migrating velocity. However, as the $H^+$ and $OH^-$ ions display a migrating velocity which is by far greater than that of all other ions, the influence of these other ions is not important and can be taken into account by apportioning small corrections to the figures given above, the character of the process being not influenced thereby. On the other hand these phenomena indicate that the acidification of the solution contained in the middle compartment can be reduced to a certain extent by adding foreign cations to the anolyte used.

The theory given above (to which I do not wish to be bound) readily explains why the liquid to be purified becomes acid in the course of electrolytic purification, and why the current yield in electrolytical desalting processes cannot exceed a proportion of about 19% of the yield calculated in conformity with Faraday's law if the desalting is effected through electrodialysis exclusively. In the first steps of the process, the current efficiency may, however, be still higher because of the action of electrolysis besides the electrodialysis. It further indicates that the current yield will be the better, the less foreign cations are contained in the anolyte beside $H^+$ ions, and the less foreign anions are contained in the catholyte beside $OH^-$ ions. This means that the maximum current yield is obtained if the anolyte consists of a pure acid and the catholyte of a pure base.

My theory explains the desalting effect to be due to the replacing of the contaminating ions contained in the middle compartment by the more speedily migrating $H^+$ and $OH^-$ ions which then disappear practically completely by forming water. As the desalting effect is consequently due to the high migrating velocity of the ions of water, no desalting effect may be obtained if the liquors contained in the electrode compartments are kept neutral, be it by a continuous mixing of the anolyte and the catholyte or by an intensive washing of the electrode compartment with pure water or neutral solutions.

The character of these phenomena is not materially altered if the anodic diaphragm is charged positively and the cathodic diaphragm negatively. The charge of the diaphragms results in changes in the movabilities or migration velocities of the ions contained in their pores, some types of ions being accelerated while others are retarded. By a suitable election of the charge of the diaphragm the acidity of the solution in the middle compartment may be influenced to a certain extent, but a desalting effect cannot be obtained thereby. There is probably nothing that could be correctly styled "an electro-osmotic desalting effect", which would only be possible if the liquid electro-osmotically forced through a diaphragm were more concentrated than the liquid to be desalted. A presumption in this direction was obviously the basis of the well known suggestion to use positively charged anodic diaphragms and negatively charged cathodic diaphragms. According to my experiences and experiments these presumptions are, however, not correct, and I have even ascertained that an electro-osmotic or electro-endosmotic migration of liquid from the electrode compartments into the middle compartment is far from being detrimental. I have not yet been able to ascertain the exact composition of the liquid which emigrates from the electrode compartments, but my experiences make me believe that they differ in composition from the electrode liquids being purer than said electrode liquids, although I have not been able to show that they consist of pure water.

I therefore believe it to be a mere prejudice that completely desalted water could only be obtained by washing the electrode compartments, or at least the last electrode compartment of a series of cells, in order to keep the concentration of the ions therein as low as possible.

The number of ions electrolytically emigrating at a given current density from the electrode compartments into the middle compartment is practically independent from their respective concentrations in the electrode liquors. This does not mean, however, that conditions are most favorable if the concentration of ions in the electrode compartments is particularly low; in the practice of my invention I use electrode liquors of comparatively high concentrations in order to obtain higher current densities and higher temperatures, it being further advantageous for the reasons given above that the anolyte be distinctly acid and the catholyte distinctly alkaline. It has turned out to be advantageous if the acid concentration in the anode compartment, expressed in chemical equivalents, is at least a hundred-fold or, with higher current densities, even some hundred-thousand-fold higher than the concentration of the purified liquid also expressed in chemical equivalents. At room temperature the anolyte may display an electrical conductivity, due only to the acid contents of from $1 \times 10^{-3}$ to $1 \times 10^0$ reciprocal ohms per cubic centimetre.

It is true that with an increased concentration of the electrode liquors the re-contamination of the liquid in the middle compartment by common diffusion, i. e. by an altogether non-electrical phenomenon, is also increased. Practically this diffusion is, however, not important during the operation of the cell, provided that diaphragms of low permeability to liquids are used. It will be appreciated that with an increased concentration of the electrode liquors their electrical conductivity is also increased which in turn permits a higher current density and a more rapid flow of the liquid to be purified through the cell, the increase of the volume of liquid purified within a given period of operation being at least proportional to the increased amount of salts reintroduced into the liquid compartment by diffusion. Only during the intervals of operation the increased diffusion is disadvantageous, but in such a case I may empty out the anode compartments, for instance by means of the cock 3, and re-fill them when re-starting the operation. Or I may intensively wash the middle compartments with raw water immediately before re-starting the operation.

The above is true only with diaphragms having a relatively low permeability, such as for instance with ceramic diaphragms which I have found to work highly satisfactorily at the anode side of my cells. With diaphragms made of sail cloth, asbestos fibres or the like conditions are different. I may use such diaphragms for instance at the cathode side of my cells, but then I do not allow the catholyte to become so concentrated as is stated above with reference to the anolyte. Such an operation of a cell is readily possible in view of the fact that in the purification of raw water the alkalinity of the catholyte is increased much more slowly than the acidity of the anolyte, the reason being that part of the cations immigrating into the catholyte consists of alkaline-earth metal cations, which are precipitated here, and that part of the caustic alkalies formed in the cathode compartment is consumed in the precipitation of alkaline-earth metal compounds such as for instance calcium bicarbonate or carbonate.

From the explanation given above it will be further understood that a washing of the cathode compartments is not absolutely necessary either, but I may nevertheless supply some liquid to these compartments in order to prevent their becoming altogether dry, as might otherwise happen. It is true that empty cathode compartments are not absolutely detrimental but they may cause contact resistances to arise which render it difficult to apply high current densities. Originally, cathodic diaphragms made of asbestos fabrics are slightly negatively charged and therefore cause a slight electro-osmotic emigration of liquid from the middle compartment into the cathode compartments. In the course of operation however, alkaline-earth metal hydroxides are deposited within the pores and on the inner face of the diaphram, reducing the negative charge of the latter and even rendering it slightly positive. By such a positively charged cathodic diaphragm some liquid is, however, transferred electro-osmotically from the cathode compartment into the middle compartment, and this effect may lower the levels of the liquid in the cathode compartments by 25 to 75 or even 100 cms. For this reason I have frequently found it advantageous to keep the level of liquid constant in the cathode compartments also, for instance by continuously adding thereto a quantity of raw water balancing the amount of liquid carried off by electro-osmotical emigration. This means, that I may provide constant levels of liquid within all the compartments of a cell, the level in the middle compartment being for instance equal to that in the anode compartment and somewhat higher than that in the cathode compartment.

According to these modifications of my invention the electrode compartments, instead of being washed with highly diluted watery solutions or even with pure water, as was heretofore customary, are only replenished with liquid to partially or completely compensate for the emigration of liquid from one or both of these compartments to the middle compartment. The liquid thus supplied to this middle compartment by electro-osmotic action is also subjected to purification, and in view thereof my invention may involve a feeding of the middle compartment in part through the anode compartment, and in the course of operation, also through the cathode compartment. This may be true to such an extent that the middle compartments receive 25 or 35 per cent of their feed through the electrode compartments. This ratio varies, however, in the course of operation; as a rule the electro-endosmotic immigration of liquid from the anode compartments slowly decreases while the immigration from the cathode compartments slowly increases.

The gradually increasing electrical conductivity of the anolyte also reduces the electro-endosmotic effect of the anodical diaphragm, and if the concentration of the acid in the anode compartment is raised to a certain limit, this diaphragm may become altogether non-charged or even slightly charged in an inverse sense. With diaphragms made of the so-called Pukall mass (a ceramic material manufactured by the Staatliche Porzellanmanufaktur at Berlin) the charge substantially disappears at an acid concentration of about 5 per cent, and these diaphragms even become slightly positively charged in contact with a solution containing 10–20 per cent of acid. In view of this changeability of the charge of the diaphragms the term "negatively charged anodical diaphragms" is here used to mean such diaphragms which are negatively charged under normal conditions, i. e. in contact with a dilute solution of potassium chloride, or with other neutral or slightly acid solutions. In contact with strongly acid solutions substantially all materials in question which are resistive to acid, become slightly positively charged and this phenomenon leads me to avoid an acid concentration above a certain upper limit, which depends upon commercial considerations. When using for instance a cell of the type shown in Fig. 1 of the drawings, this cell being altogether closed at the bottom, an electro-endosmotic effect of the anodic diaphragm causing an immigration of liquid into the anode compartment would gradually raise the level of liquid within this compartment, until the anolyte flows over. In order to prevent this, I avoid acid concentrations in the anode compartments above about 5% by withdrawing some liquid from these compartments at intervals; the liquid withdrawn is then automatically replaced by raw water. It will be noted that such an operation of the cells permits the use of cup-shaped anodic diaphragms open only on their top, and not requiring any tight seals.

An addition of foreign cations to the anolyte or of foreign anions to the catholyte enables me to solve certain by-problems in the electrolytic desalting of liquids. As mentioned above, such additions allow to control the acidity or alkalinity of the water in purification. By similar means I may avoid an undesired haziness of the purified liquid or remove certain colloidal substances therefrom by precipitation. In order to obtain such effects I may add to the anolyte cations such as those of magnesium or aluminium which when immigrated into the middle compartment precipitate in the form of the corresponding hydroxides which exert a strong absorbing and clarifying effect. Similar effects are obtained for similar reasons, if aluminates, stannates, zincates or similar metallates are added to the catholyte.

Electrode liquors of an increased electrical conductivity not only reduce the voltage required and consequently the consumption of energy for a given output, but they further enable me to highly increase the current density and to consequently obtain a higher capacity of a cell of a given size. With an increased current density higher temperatures can be obtained and maintained in the middle compartments of the cells, and this results in a further increase in conductivity with attendant increase in current density.

In the practice of my invention I may use unusually high current densities, and I have found it advantageous to operate my cells at average current densities equal to or exceeding that defined by the formula $$\frac{I}{a} = 10Vc$$

wherein $I$ is the current intensity in amps., $a$ is the active area of the middle compartments of the cells in square decimetres, $$\frac{I}{a}$$

is the average current density in the middle compartments, $V$ is the average voltage applied to the electrodes of a cell, and $c$ is the conductivity of the liquid to be purified, expressed in reciprocal ohms per cubic centimetre.

I have further ascertained that at elevated temperatures a purer product can be obtained. Experience has taught me that there is a lower limit of electrical conductivity of the purified water which can hardly be understepped, at least not without extraordinarily increasing the consumption of energy. Now, as the same electrical conductivity corresponds to comparatively higher electrolyte contents of the liquid at lower temperatures, and to lower electrolyte contents at higher temperatures, I prefer carrying out the desalting process at comparatively high temperatures ranging from 40 or even 70 to 90 or 95° C. In order to provide for the desired temperature at a minimum consumption of heat, I preheat the water to be purified with the hot purified water in a heat exchanger of the type shown in Fig. 5 of the drawings, or of any other usual type. By this comparatively simple provision I obtain an efficiency of these cells which is, at high current densities, up to 30% higher than the normal one. With lower current densities the influence is not so important, but I also obtain a somewhat more complete desalting effect and a somewhat lower consumption of energy.

With the highly conductive anode liquors and the particularly high current densities which I may use in the practice of my invention—the current densities being materially higher than was heretofore possible in the electrical purification of raw water—the use of platinum anodes becomes commercially feasible and advantageous, the required quantity of this very expensive metal being a comparatively small one. This is particularly true if the platinum is used in the form of wires such as for instance in the form of wire coils as shown in Fig. 1, or of straight separate wires as shown in Fig. 3. The cost of installation of such platinum electrodes may even be lower than that of magnetite electrodes. On the other hand platinum anodes submerged in an acid electrolyte cause a formation of considerable quantities of ozone which can be utilized for sterilizing the liquid to be purified.

With the new method here described in detail, which is mainly characterized by the use of anolytes of a comparatively high acid concentration, and with cells of the type here described, I obtain current yields up to about 90% of the theoretical maximum value and this, when calculated according to Faraday's law is a very favorable yield, while on the other hand, in proper practice, the yield is never below 80% of said theoretical maximum. The energy consumption depends on the average voltage applied to the cells, and the output, which is improved by an elevated operating temperature, is as a rule large enough to render the installation of such cells, even if provided with platinum anodes, less expensive than that of distillation plants of equal output and efficiency. This is true with regard to outputs up to 5 cbms. per hour.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The process of desalting liquid, which comprises maintaining an electric potential gradient through the liquid to be treated, immersing the positive and the negative electrodes in other bodies of liquids, both separated from the body to be treated by porous diaphragms and increasing the acid content of the anodic liquor during the flow of the current by adding a quantity of liquid to the anodic chamber, which is always equal to the liquid amount lost in said anodic chamber by electroendosmosis, electrolysis, evaporation and the like and using a negatively charged cup-shaped anodic diaphragm having no outlet nor overflow or the like through which the liquid contained in the anodic chamber could be educted from said chamber.

2. An electrolytic cell for the desalting of liquids comprising a tank, two perforated sheet metal cathodes concentrically arranged in said tank, a flexible diaphragm of comparatively high permeability separating the cathode chambers from the body of liquid to be treated, two cylindrical anodic diaphragms consisting of a negatively charged material of comparatively low permeability concentrically arranged within the space defined by the two cathodic diaphragms, the space defined by the two anodic diaphragms being closed at the bottom to form a substantially closed anode compartment, means for maintaining a constant level of liquid within this anode compartment by causing amounts of liquid to flow into the anode chamber equal to those withdrawn from the anodic chamber by electroosmosis, evaporation and the like, means for supplying the liquid to be purified to the topmost portion of the middle compartment represented by the spaces between the anodic and the cathodic diaphragms, and means for withdrawing the purified liquid from said compartment.

3. An electrolytic device for desalting liquids comprising a series of cascaded cells, means for supplying liquid partly purified in one cell to the middle compartment of the next succeeding cell, leveling devices capable of maintaining a constant level of liquid in each of the anode compartments by adding to each anodic compartment amounts of liquids equal to those withdrawn from the anodic chambers by electroosmosis, evaporation and the like, which leveling devices also serve to prevent dilution of the liquid in the anodic chambers except to compensate for such amounts as are withdrawn by electroosmosis, evaporation and the like, means preventing withdrawal of liquid from the anodic chambers except by electroosmosis, evaporation and the like, electrodes in said cells, negatively charged anodic diaphragms of comparatively low permeability for liquids and cathodic diaphragms of comparatively high permeability for liquids arranged in said cells.

4. A process for desalting a liquid, which consists in conducting said liquid through a cell containing an anode immersed in an anolyte and also containing a cathode in contact with a catholyte, maintaining an electric potential gradient through the liquid to be treated, protecting the anolyte and said liquid from mutual contact by surrounding in turn the liquid to be treated exteriorly by a cathodic diaphragm, causing the liquid to be treated which overflows the cathode to be caught exteriorly of said cathode by means of a collecting ring, and brought by said ring to a point of discharge, and maintaining a practically constant level of the anolyte by compensating for the liquid losses in the same caused by electroosmosis, evaporation and the like, while preventing physical disturbance of said anolyte such as active circulation or flushing thereof.

5. The process for desalting liquids, which, in a combined group of steps, comprises maintaining an electric potential gradient through the liquid to be treated, immersing the positive electrode in another body of liquid separated from the body of liquid to be treated by a porous diaphragm, immersing the negative electrode in a third body of liquid, also separated from the body of liquid to be treated by a porous diaphragm, and increasing the acid content in the anodic chamber during the flow of the current by providing that the anions arriving in the anode chamber accumulate there, by restricting the amount of liquid added to the anolyte to that amount, which is withdrawn from the anodic compartment by the electroendosmotic action of the diaphragm and by evaporation, continuously giving the anolyte an increased electrical conductivity of at least $1\times 10^{-3}$ ohms $^{-1}$ per cubic cm. by causing pure acid to be added thereto and preventing removal of any of the anolyte during operation of the process except by the electroendosmotic action of the diaphragm due to the flow of the electric current and by evaporation and the like.

6. The process for desalting liquids, which, in a combined group of steps, comprises maintaining an electric potential gradient through the liquid to be treated, immersing the positive electrode in another body of liquid separated from the body of liquid to be treated by a porous diaphragm, immersing the negative electrode in a third body of liquid, also separated from the body of liquid to be treated by a porous diaphragm, and increasing the acid content in the anodic chamber during the flow of the current by providing that the anions arriving in the anode chamber accumulate there, by restricting the amount of liquid added to the anolyte to that amount, which is withdrawn from the anodic compartment by the electroendosmotic action of the diaphragm and by evaporation, utilizing platinum anodes with an anodic current density of at least four amperes per square decimeter of anode surface actively used so as to produce ozone, and preventing removal of any of the anolyte during operation of the process except by the electroendosmotic action of the diaphragm due to the flow of the electric current and by evaporation and the like.

7. The method of electrically desalting liquids comprising subjecting a body of liquid to be desalted to the action of a direct electrical current, keeping said liquid in direct contact with a mercury cathode, but separated from the anolyte by a diaphragm negatively charged when in contact with a dilute solution of potassium chloride, and maintaining the anolyte at an acid reaction and at an electrical conductivity not below one thousandth reciprocal ohm per cubic centimetre.

8. The method of electrically desalting liquids comprising subjecting a body of liquid to be desalted to the action of a direct electrical current, while keeping it in direct contact with a mercury cathode, but separated from the anolyte by a diaphragm, maintaining the anolyte at an acid reaction and at an electrical conductivity not below one thousandth reciprocal ohm per cubic centimetre, withdrawing the liquid, when partly desalted, and further desalting it to the desired extent by subjecting it to the action of a direct electrical current while keeping it out of direct contact with the anolyte and the catholyte.

9. The process for desalting liquids, in a combined group of steps, which comprises maintaining an electric potential gradient through the liquid to be treated, immersing the positive and the negative electrodes in other bodies of liquids, both separated from the body to be treated by porous diaphragms, and providing that the acid content increases during the flow of the current in the anodic chamber, keeping the anodic liquor at a constant level by compensating the liquid losses caused in the anodic chamber by electro-endosmosis, by evaporation and the like, by the addition of the corresponding amount of liquid and preheating the liquid to be treated in heat exchange with treated liquid, increasing the concentration of the cathodic liquor, and simultaneously preventing removal of any of the anodic liquor during operation of the process except by the electro-endosmotic action of the diaphragm due to the flow of the electric current and by evaporation and the like.

10. The process for desalting liquids, which, in a combined group of steps, comprises maintaining an electric potential gradient through the liquid to be treated, immersing the positive and the negative electrodes in other bodies of liquids, both separated from the body to be treated by porous diaphragms and providing, that the acid content increases in the anodic chamber during the flow of the current, keeping the anodic liquor at a constant level by compensating the liquid losses caused in the anodic chamber by electroendosmosis, by evaporation and the like, by the addition of the corresponding amount of liquid and heating the liquid to be treated within the cathodic chamber of the cell, and simultaneously preventing removal of any of the anodic liquor during operation of the process except by the electro-endosmotic action of the diaphragm due to the flow of the electric current and by evaporation and the like.

JEAN BILLITER.